(12) United States Patent
Freeman et al.

(10) Patent No.: US 8,886,536 B2
(45) Date of Patent: Nov. 11, 2014

(54) SYSTEM AND METHOD FOR DELIVERING TARGETED ADVERTISEMENTS AND TRACKING ADVERTISEMENT INTERACTIONS IN VOICE RECOGNITION CONTEXTS

(71) Applicant: VoiceBox Technologies Corporation, Bellevue, WA (US)

(72) Inventors: Tom Freeman, Mercer Island, WA (US); Mike Kennwick, Bellevue, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/016,757

(22) Filed: Sep. 3, 2013

(65) Prior Publication Data
US 2014/0012577 A1 Jan. 9, 2014

Related U.S. Application Data

(63) Continuation of application No. 13/371,870, filed on Feb. 13, 2012, now Pat. No. 8,527,274, which is a continuation of application No. 12/847,564, filed on Jul. 30, 2010, now Pat. No. 8,145,489, which is a continuation of application No. 11/671,526, filed on Feb. 6, 2007, now Pat. No. 7,818,176.

(51) Int. Cl.
| | | |
|---|---|---|
| *G10L 15/18* | (2013.01) | |
| *G06F 17/27* | (2006.01) | |
| *G10L 21/00* | (2013.01) | |
| *G06Q 30/00* | (2012.01) | |
| *G10L 15/26* | (2006.01) | |
| *G06Q 30/02* | (2012.01) | |

(52) U.S. Cl.
CPC .............. *G10L 15/18* (2013.01); *G10L 15/265* (2013.01); *G06Q 30/0251* (2013.01); *G06Q 30/0241* (2013.01); *G06Q 30/0242* (2013.01)

USPC ............ 704/257; 704/9; 704/270.1; 705/14.4

(58) Field of Classification Search
None
See application file for complete search history.

(56) References Cited

U.S. PATENT DOCUMENTS

| | | | |
|---|---|---|---|
| 4,430,669 A | 2/1984 | Cheung | ......................... 358/122 |
| 4,821,027 A | 4/1989 | Mallory et al. | ............... 340/521 |

(Continued)

FOREIGN PATENT DOCUMENTS

| | | |
|---|---|---|
| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Brian Albertalli
(74) *Attorney, Agent, or Firm* — Pillsbury Winthrop Shaw Pittman LLP

(57) ABSTRACT

The system and method described herein may use various natural language models to deliver targeted advertisements and track advertisement interactions in voice recognition contexts. In particular, in response to an input device receiving an utterance, a conversational language processor may select and deliver one or more advertisements targeted to a user that spoke the utterance based on cognitive models associated with the user, various users having similar characteristics to the user, an environment in which the user spoke the utterance, or other criteria. Further, subsequent interaction with the targeted advertisements may be tracked to build and refine the cognitive models and thereby enhance the information used to deliver targeted advertisements in response to subsequent utterances.

55 Claims, 3 Drawing Sheets

(56) References Cited

U.S. PATENT DOCUMENTS

| | | | |
|---|---|---|---|
| 4,829,423 A | 5/1989 | Tennant et al. | 364/200 |
| 4,910,784 A | 3/1990 | Doddington et al. | 381/43 |
| 5,027,406 A | 6/1991 | Roberts et al. | 381/43 |
| 5,155,743 A | 10/1992 | Jacobs | 375/28 |
| 5,164,904 A | 11/1992 | Sumner | 364/436 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,559,864 A | 9/1996 | Kennedy, Jr. | 379/59 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,652,570 A | 7/1997 | Lepkofker | 340/573 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,841 A | 6/1998 | Salazar et al. | 704/225 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,950,167 A | 9/1999 | Yaker | 704/275 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,028,514 A | 2/2000 | Lemelson et al. | 340/539 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,314,402 B1 | 11/2001 | Monaco et al. | 704/275 |
| 6,321,196 B1 | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/275 |
| 6,393,428 B1 | 5/2002 | Miller et al. | 707/102 |
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,411,893 B2 | 6/2002 | Ruhl | 701/207 |
| 6,415,257 B1 | 7/2002 | Junqua et al. | 704/275 |
| 6,418,210 B1 | 7/2002 | Sayko | 379/142.15 |

(56) References Cited

U.S. PATENT DOCUMENTS

| | | | |
|---|---|---|---|
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1 | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1 | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,487,494 B2 | 11/2002 | Odinak et al. | 701/202 |
| 6,487,495 B1 | 11/2002 | Gale et al. | 701/209 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |
| 6,505,155 B1 | 1/2003 | Vanbuskirk et al. | 704/246 |
| 6,510,417 B1 | 1/2003 | Woods et al. | 704/275 |
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 | 4/2003 | Sasaki et al. | 704/257 |
| 6,556,973 B1 | 4/2003 | Lewin | 704/277 |
| 6,560,576 B1 | 5/2003 | Cohen et al. | 704/270 |
| 6,560,590 B1 | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,584,439 B1 | 6/2003 | Geilhufe et al. | 704/270 |
| 6,587,858 B1 | 7/2003 | Strazza | 707/102 |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/251 |
| 6,601,026 B2 | 7/2003 | Appelt et al. | 704/9 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,636,790 B1 | 10/2003 | Lightner et al. | 701/33 |
| 6,643,620 B1 | 11/2003 | Contolini et al. | 704/270 |
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,576 B1 | 3/2004 | Brachman et al. | 455/503 |
| 6,704,708 B1 | 3/2004 | Pickering | 704/235 |
| 6,707,421 B1 | 3/2004 | Drury et al. | 342/357.1 |
| 6,708,150 B1 | 3/2004 | Hirayama et al. | 704/243 |
| 6,721,001 B1 | 4/2004 | Berstis | 348/231.3 |
| 6,721,633 B2 | 4/2004 | Funk et al. | 701/1 |
| 6,721,706 B1 | 4/2004 | Strubbe et al. | 704/275 |
| 6,726,636 B2 | 4/2004 | Der Ghazarian et al. | 600/532 |
| 6,735,592 B1 | 5/2004 | Neumann et al. | 707/101 |
| 6,739,556 B1 | 5/2004 | Langston | 244/189 |
| 6,741,931 B1 | 5/2004 | Kohut et al. | 701/209 |
| 6,742,021 B1 | 5/2004 | Halverson et al. | 709/218 |
| 6,745,161 B1 | 6/2004 | Arnold et al. | 704/7 |
| 6,751,591 B1 | 6/2004 | Gorin et al. | 704/257 |
| 6,751,612 B1 | 6/2004 | Schuetze et al. | 707/4 |
| 6,754,485 B1 | 6/2004 | Obradovich et al. | 455/414.1 |
| 6,754,627 B2 | 6/2004 | Woodward | 704/235 |
| 6,757,544 B2 | 6/2004 | Rangarajan et al. | 455/456.1 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,813,341 B1 | 11/2004 | Mahoney | 379/88.01 |
| 6,829,603 B1 | 12/2004 | Chai et al. | 707/5 |
| 6,832,230 B1 | 12/2004 | Zilliacus et al. | 707/203 |
| 6,833,848 B1 | 12/2004 | Wolff et al. | 345/719 |
| 6,850,603 B1 | 2/2005 | Eberle et al. | 379/88.16 |
| 6,856,990 B2 | 2/2005 | Barile et al. | 707/10 |
| 6,865,481 B2 | 3/2005 | Kawazoe et al. | 701/211 |
| 6,868,380 B2 | 3/2005 | Kroeker | 704/240 |
| 6,868,385 B1 | 3/2005 | Gerson | 704/275 |
| 6,873,837 B1 | 3/2005 | Yoshioka et al. | 455/321 |
| 6,877,001 B2 | 4/2005 | Wolf et al. | 707/3 |
| 6,877,134 B1 | 4/2005 | Fuller et al. | 715/500.1 |
| 6,901,366 B1 | 5/2005 | Kuhn et al. | 704/275 |
| 6,910,003 B1 | 6/2005 | Arnold et al. | 704/4 |
| 6,912,498 B2 | 6/2005 | Stevens et al. | 704/235 |
| 6,915,126 B2 | 7/2005 | Mazzara, Jr. | 455/411 |
| 6,928,614 B1 | 8/2005 | Everhart | 715/728 |
| 6,934,756 B2 | 8/2005 | Maes | 709/227 |
| 6,937,977 B2 | 8/2005 | Gerson | 704/201 |
| 6,937,982 B2 | 8/2005 | Kitaoka et al. | 704/252 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,959,276 B2 | 10/2005 | Droppo et al. | 704/226 |
| 6,961,700 B2 | 11/2005 | Mitchell et al. | 704/235 |
| 6,963,759 B1 | 11/2005 | Gerson | 455/563 |
| 6,964,023 B2 | 11/2005 | Maes et al. | 715/811 |
| 6,968,311 B2 | 11/2005 | Knockeart et al. | 704/270 |
| 6,973,387 B2 | 12/2005 | Masclet et al. | 701/211 |
| 6,975,993 B1 | 12/2005 | Keiller | 704/276 |
| 6,980,092 B2 | 12/2005 | Turnbull et al. | 340/425.5 |
| 6,983,055 B2 | 1/2006 | Luo | 381/313 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,586 B2 | 4/2006 | Bushey et al. | 379/265.09 |
| 7,027,975 B1 | 4/2006 | Pazandak et al. | 704/9 |
| 7,035,415 B2 | 4/2006 | Belt et al. | 381/92 |
| 7,036,128 B1 | 4/2006 | Julia et al. | 719/317 |
| 7,043,425 B2 | 5/2006 | Pao | 704/211 |
| 7,054,817 B2 | 5/2006 | Shao | 704/270 |
| 7,058,890 B2 | 6/2006 | George et al. | 715/728 |
| 7,062,488 B1 | 6/2006 | Reisman | 707/8 |
| 7,069,220 B2 | 6/2006 | Coffman et al. | 704/275 |
| 7,072,834 B2 | 7/2006 | Zhou | 704/244 |
| 7,076,362 B2 | 7/2006 | Ohtsuji et al. | 701/211 |
| 7,082,469 B2 | 7/2006 | Gold et al. | 709/231 |
| 7,085,708 B2 | 8/2006 | Manson | 704/9 |
| 7,092,928 B1 | 8/2006 | Elad et al. | 706/60 |
| 7,107,210 B2 | 9/2006 | Deng et al. | 704/226 |
| 7,107,218 B1 | 9/2006 | Preston | 704/270 |
| 7,110,951 B1 | 9/2006 | Lemelson et al. | 704/270 |
| 7,127,400 B2 | 10/2006 | Koch | 704/270.1 |
| 7,130,390 B2 | 10/2006 | Abburi | 379/88.17 |
| 7,136,875 B2 | 11/2006 | Anderson et al. | 707/104.1 |
| 7,137,126 B1 | 11/2006 | Coffman et al. | 719/328 |
| 7,143,037 B1 | 11/2006 | Chestnut | 704/251 |
| 7,143,039 B1 | 11/2006 | Stifelman et al. | 704/270 |

(56) References Cited

U.S. PATENT DOCUMENTS

| | | | | |
|---|---|---|---|---|
| 7,146,319 | B2 | 12/2006 | Hunt | 704/254 |
| 7,149,696 | B2 | 12/2006 | Shimizu et al. | 705/1 |
| 7,165,028 | B2 | 1/2007 | Gong | 704/233 |
| 7,170,993 | B2 * | 1/2007 | Anderson et al. | 379/265.09 |
| 7,171,291 | B2 | 1/2007 | Obradovich | 701/29 |
| 7,174,300 | B2 | 2/2007 | Bush | 704/275 |
| 7,177,798 | B2 | 2/2007 | Hsu et al. | 704/9 |
| 7,184,957 | B2 | 2/2007 | Brookes et al. | 704/246 |
| 7,190,770 | B2 | 3/2007 | Ando et al. | 379/88.01 |
| 7,197,069 | B2 | 3/2007 | Agazzi et al. | 375/233 |
| 7,197,460 | B1 | 3/2007 | Gupta et al. | 704/270.1 |
| 7,203,644 | B2 | 4/2007 | Anderson et al. | 704/246 |
| 7,206,418 | B2 | 4/2007 | Yang et al. | 381/92 |
| 7,207,011 | B2 | 4/2007 | Mulvey et al. | 715/812 |
| 7,215,941 | B2 | 5/2007 | Beckmann et al. | 455/404.1 |
| 7,228,276 | B2 | 6/2007 | Omote et al. | 704/243 |
| 7,231,343 | B1 | 6/2007 | Treadgold et al. | 704/9 |
| 7,236,923 | B1 | 6/2007 | Gupta | 704/9 |
| 7,254,482 | B2 | 8/2007 | Kawasaki et al. | 701/211 |
| 7,272,212 | B2 | 9/2007 | Eberle et al. | 379/88.17 |
| 7,277,854 | B2 | 10/2007 | Bennett et al. | 704/257 |
| 7,283,829 | B2 | 10/2007 | Christenson et al. | 455/461 |
| 7,283,951 | B2 | 10/2007 | Marchisio et al. | 704/9 |
| 7,289,606 | B2 | 10/2007 | Sibal et al. | 379/52 |
| 7,299,186 | B2 | 11/2007 | Kuzunuki et al. | 704/270.1 |
| 7,301,093 | B2 | 11/2007 | Sater et al. | 84/615 |
| 7,305,381 | B1 | 12/2007 | Poppink et al. | 1/1 |
| 7,321,850 | B2 | 1/2008 | Wakita | 704/10 |
| 7,328,155 | B2 | 2/2008 | Endo et al. | 704/251 |
| 7,337,116 | B2 | 2/2008 | Charlesworth et al. | 704/254 |
| 7,340,040 | B1 | 3/2008 | Saylor et al. | 379/67.1 |
| 7,366,285 | B2 | 4/2008 | Parolkar et al. | 379/88.17 |
| 7,366,669 | B2 | 4/2008 | Nishitani et al. | 704/256 |
| 7,376,645 | B2 | 5/2008 | Bernard | 707/3 |
| 7,386,443 | B1 | 6/2008 | Parthasarathy et al. | 704/201 |
| 7,398,209 | B2 | 7/2008 | Kennewick et al. | 704/255 |
| 7,406,421 | B2 | 7/2008 | Odinak et al. | 704/275 |
| 7,415,414 | B2 | 8/2008 | Azara et al. | 704/270 |
| 7,421,393 | B1 | 9/2008 | Di Fabbrizio et al. | 704/275 |
| 7,424,431 | B2 | 9/2008 | Greene et al. | 704/270 |
| 7,447,635 | B1 | 11/2008 | Konopka et al. | 704/275 |
| 7,451,088 | B1 | 11/2008 | Ehlen et al. | 704/270.1 |
| 7,454,608 | B2 | 11/2008 | Gopalakrishnan et al. | 713/100 |
| 7,461,059 | B2 | 12/2008 | Richardson et al. | 707/5 |
| 7,472,020 | B2 | 12/2008 | Brulle-Drews | 701/211 |
| 7,472,060 | B1 | 12/2008 | Gorin et al. | 704/240 |
| 7,472,075 | B2 | 12/2008 | Odinak et al. | 705/26 |
| 7,477,909 | B2 * | 1/2009 | Roth | 455/466 |
| 7,478,036 | B2 | 1/2009 | Shen et al. | 704/9 |
| 7,487,088 | B1 | 2/2009 | Gorin et al. | 704/240 |
| 7,487,110 | B2 | 2/2009 | Bennett et al. | 705/26 |
| 7,493,259 | B2 | 2/2009 | Jones et al. | 704/257 |
| 7,493,559 | B1 | 2/2009 | Wolff et al. | 715/727 |
| 7,502,672 | B1 | 3/2009 | Kolls | 701/29 |
| 7,502,738 | B2 | 3/2009 | Kennewick et al. | 704/257 |
| 7,516,076 | B2 | 4/2009 | Walker et al. | 704/275 |
| 7,529,675 | B2 | 5/2009 | Maes | 704/270.1 |
| 7,536,297 | B2 | 5/2009 | Byrd et al. | 704/10 |
| 7,536,374 | B2 | 5/2009 | Au | 706/55 |
| 7,542,894 | B2 | 6/2009 | Murata | 704/9 |
| 7,546,382 | B2 | 6/2009 | Healey et al. | 709/246 |
| 7,548,491 | B2 | 6/2009 | Macfarlane | 367/198 |
| 7,552,054 | B1 * | 6/2009 | Stifelman et al. | 704/270 |
| 7,558,730 | B2 | 7/2009 | Davis et al. | 704/235 |
| 7,574,362 | B2 | 8/2009 | Walker et al. | 704/275 |
| 7,577,244 | B2 | 8/2009 | Taschereau | 379/218.01 |
| 7,606,708 | B2 | 10/2009 | Hwang | 704/257 |
| 7,620,549 | B2 | 11/2009 | Di Cristo et al. | 704/257 |
| 7,634,409 | B2 | 12/2009 | Kennewick et al. | 704/257 |
| 7,640,006 | B2 | 12/2009 | Portman et al. | 455/412.1 |
| 7,640,160 | B2 | 12/2009 | Di Cristo et al. | 704/257 |
| 7,640,272 | B2 | 12/2009 | Mahajan et al. | 707/104.1 |
| 7,676,365 | B2 | 3/2010 | Hwang et al. | 704/240 |
| 7,676,369 | B2 | 3/2010 | Fujimoto et al. | 704/270 |
| 7,684,977 | B2 | 3/2010 | Morikawa | 704/211 |
| 7,693,720 | B2 | 4/2010 | Kennewick et al. | 704/275 |
| 7,729,916 | B2 | 6/2010 | Coffman et al. | 704/270 |
| 7,729,918 | B2 | 6/2010 | Walker et al. | 704/275 |
| 7,729,920 | B2 | 6/2010 | Chaar et al. | 704/275 |
| 7,734,287 | B2 | 6/2010 | Ying | 455/423 |
| 7,748,021 | B2 | 6/2010 | Obradovich | 725/105 |
| 7,788,084 | B2 | 8/2010 | Brun et al. | 704/7 |
| 7,801,731 | B2 | 9/2010 | Odinak et al. | 704/275 |
| 7,809,570 | B2 | 10/2010 | Kennewick et al. | 704/257 |
| 7,818,176 | B2 | 10/2010 | Freeman et al. | 704/270 |
| 7,831,426 | B2 | 11/2010 | Bennett | 704/252 |
| 7,831,433 | B1 | 11/2010 | Belvin et al. | 704/275 |
| 7,856,358 | B2 * | 12/2010 | Ho | 704/270 |
| 7,873,519 | B2 | 1/2011 | Bennett | 704/257 |
| 7,873,523 | B2 | 1/2011 | Potter et al. | 704/275 |
| 7,873,654 | B2 | 1/2011 | Bernard | 707/769 |
| 7,881,936 | B2 | 2/2011 | Longe et al. | 704/257 |
| 7,890,324 | B2 | 2/2011 | Bangalore et al. | 704/231 |
| 7,894,849 | B2 | 2/2011 | Kass et al. | 455/550.1 |
| 7,902,969 | B2 | 3/2011 | Obradovich | 340/439 |
| 7,917,367 | B2 | 3/2011 | Di Cristo et al. | 704/270.1 |
| 7,920,682 | B2 | 4/2011 | Byrne et al. | 379/88.18 |
| 7,949,529 | B2 | 5/2011 | Weider et al. | 704/270 |
| 7,949,537 | B2 | 5/2011 | Walker et al. | 704/275 |
| 7,953,732 | B2 | 5/2011 | Frank et al. | 707/724 |
| 7,974,875 | B1 | 7/2011 | Quilici et al. | 705/14.4 |
| 7,983,917 | B2 | 7/2011 | Kennewick et al. | 704/257 |
| 7,984,287 | B2 | 7/2011 | Gopalakrishnan et al. | 713/100 |
| 8,005,683 | B2 | 8/2011 | Tessel et al. | 704/275 |
| 8,015,006 | B2 | 9/2011 | Kennewick et al. | 704/236 |
| 8,060,367 | B2 | 11/2011 | Keaveney | 704/247 |
| 8,069,046 | B2 | 11/2011 | Kennewick et al. | 704/257 |
| 8,073,681 | B2 | 12/2011 | Baldwin et al. | 704/9 |
| 8,077,975 | B2 | 12/2011 | Ma et al. | 382/187 |
| 8,082,153 | B2 | 12/2011 | Coffman et al. | 704/270 |
| 8,086,463 | B2 | 12/2011 | Ativanichayaphong et al. | 704/275 |
| 8,112,275 | B2 | 2/2012 | Kennewick et al. | 704/240 |
| 8,140,327 | B2 | 3/2012 | Kennewick et al. | 704/226 |
| 8,140,335 | B2 | 3/2012 | Kennewick et al. | 704/257 |
| 8,145,489 | B2 | 3/2012 | Freeman et al. | 704/257 |
| 8,150,694 | B2 | 4/2012 | Kennewick et al. | 704/257 |
| 8,155,962 | B2 | 4/2012 | Kennewick et al. | 704/257 |
| 8,170,867 | B2 | 5/2012 | Germain | 704/9 |
| 8,195,468 | B2 | 6/2012 | Weider et al. | 704/275 |
| 8,219,399 | B2 | 7/2012 | Lutz et al. | 704/270 |
| 8,219,599 | B2 | 7/2012 | Tunstall-Pedoe | 707/955 |
| 8,224,652 | B2 | 7/2012 | Wang et al. | 704/275 |
| 8,255,224 | B2 | 8/2012 | Singleton et al. | 704/275 |
| 8,326,627 | B2 | 12/2012 | Kennewick et al. | 704/257 |
| 8,326,634 | B2 | 12/2012 | Di Cristo et al. | 704/270.1 |
| 8,326,637 | B2 | 12/2012 | Baldwin et al. | 704/275 |
| 8,332,224 | B2 | 12/2012 | Di Cristo et al. | 704/257 |
| 8,370,147 | B2 | 2/2013 | Kennewick et al. | 704/257 |
| 8,447,607 | B2 | 5/2013 | Weider et al. | 704/250 |
| 8,452,598 | B2 | 5/2013 | Kennewick et al. | 704/257 |
| 8,509,403 | B2 * | 8/2013 | Chiu et al. | 379/114.13 |
| 8,515,765 | B2 | 8/2013 | Baldwin et al. | 704/275 |
| 8,527,274 | B2 | 9/2013 | Freeman et al. | 704/257 |
| 8,589,161 | B2 | 11/2013 | Kennewick et al. | 704/252 |
| 8,620,659 | B2 | 12/2013 | Di Cristo et al. | 704/257 |
| 8,719,009 | B2 | 5/2014 | Baldwin et al. | 704/9 |
| 8,719,026 | B2 | 5/2014 | Kennewick et al. | 704/257 |
| 8,738,380 | B2 | 5/2014 | Baldwin et al. | 704/257 |
| 2001/0041980 | A1 | 11/2001 | Howard et al. | 704/270 |
| 2001/0049601 | A1 | 12/2001 | Kroeker et al. | 704/254 |
| 2001/0054087 | A1 | 12/2001 | Flom et al. | 709/218 |
| 2002/0015500 | A1 | 2/2002 | Belt et al. | 381/66 |
| 2002/0022927 | A1 | 2/2002 | Lemelson et al. | 701/301 |
| 2002/0029261 | A1 | 3/2002 | Shibata | 709/219 |
| 2002/0032752 | A1 | 3/2002 | Gold et al. | 709/218 |
| 2002/0035501 | A1 | 3/2002 | Handel et al. | 705/10 |
| 2002/0040297 | A1 | 4/2002 | Tsiao et al. | 704/257 |
| 2002/0049535 | A1 | 4/2002 | Rigo et al. | 701/211 |
| 2002/0049805 | A1 | 4/2002 | Yamada et al. | 709/202 |
| 2002/0065568 | A1 | 5/2002 | Silfvast et al. | 700/94 |
| 2002/0067839 | A1 | 6/2002 | Heinrich | 381/110 |
| 2002/0069059 | A1 | 6/2002 | Smith | 704/257 |
| 2002/0069071 | A1 | 6/2002 | Knockeart et al. | 704/275 |

(56) References Cited

U.S. PATENT DOCUMENTS

| | | |
|---|---|---|
| 2002/0082911 A1 | 6/2002 | Dunn et al. ............... 705/14 |
| 2002/0087326 A1 | 7/2002 | Lee et al. ............. 704/270.1 |
| 2002/0087525 A1 | 7/2002 | Abbott et al. ............... 707/3 |
| 2002/0107694 A1 | 8/2002 | Lerg ........................ 704/273 |
| 2002/0120609 A1 | 8/2002 | Lang et al. .................. 707/1 |
| 2002/0124050 A1 | 9/2002 | Middeljans ............... 709/203 |
| 2002/0133354 A1 | 9/2002 | Ross et al. ............... 704/275 |
| 2002/0133402 A1 | 9/2002 | Faber et al. ............... 705/14 |
| 2002/0135618 A1 | 9/2002 | Maes et al. ............... 345/767 |
| 2002/0138248 A1 | 9/2002 | Corston-Oliver et al. ...... 704/1 |
| 2002/0143532 A1 | 10/2002 | McLean et al. .......... 704/235 |
| 2002/0143535 A1 | 10/2002 | Kist et al. ................ 704/251 |
| 2002/0161646 A1 | 10/2002 | Gailey et al. ............... 705/14 |
| 2002/0173333 A1 | 11/2002 | Buchholz et al. .......... 455/527 |
| 2002/0173961 A1 | 11/2002 | Guerra ..................... 704/258 |
| 2002/0184373 A1 | 12/2002 | Maes ........................ 709/228 |
| 2002/0188602 A1 | 12/2002 | Stubler et al. ............... 707/3 |
| 2002/0198714 A1 | 12/2002 | Zhou ........................ 704/252 |
| 2003/0014261 A1 | 1/2003 | Kageyama ............... 704/275 |
| 2003/0016835 A1 | 1/2003 | Elko et al. ................. 381/92 |
| 2003/0046346 A1 | 3/2003 | Mumick et al. ........... 709/205 |
| 2003/0064709 A1 | 4/2003 | Gailey et al. ............. 455/412 |
| 2003/0065427 A1 | 4/2003 | Funk et al. .................. 701/1 |
| 2003/0069734 A1 | 4/2003 | Everhart .................... 704/275 |
| 2003/0088421 A1 | 5/2003 | Maes et al. ............. 704/270.1 |
| 2003/0097249 A1 | 5/2003 | Walker et al. ............... 704/1 |
| 2003/0110037 A1 | 6/2003 | Walker et al. ............. 704/257 |
| 2003/0112267 A1 | 6/2003 | Belrose .................... 345/728 |
| 2003/0115062 A1 | 6/2003 | Walker et al. ............. 704/258 |
| 2003/0120493 A1 | 6/2003 | Gupta .................... 704/270.1 |
| 2003/0135488 A1 | 7/2003 | Amir et al. .................. 707/3 |
| 2003/0144846 A1 | 7/2003 | Denenberg et al. ........ 704/277 |
| 2003/0158731 A1 | 8/2003 | Falcon et al. .............. 704/231 |
| 2003/0161448 A1 | 8/2003 | Parolkar et al. ........... 379/88.17 |
| 2003/0182132 A1 | 9/2003 | Niemoeller ............... 704/275 |
| 2003/0204492 A1 | 10/2003 | Wolf et al. .................. 707/3 |
| 2003/0206640 A1 | 11/2003 | Malvar et al. .............. 381/93 |
| 2003/0212550 A1 | 11/2003 | Ubale ....................... 704/215 |
| 2003/0212558 A1 | 11/2003 | Matula ..................... 704/260 |
| 2003/0212562 A1 | 11/2003 | Patel et al. ................ 704/275 |
| 2003/0225825 A1 | 12/2003 | Healey et al. ............. 709/203 |
| 2003/0236664 A1 | 12/2003 | Sharma .................... 704/251 |
| 2004/0006475 A1 | 1/2004 | Ehlen et al. ............. 704/270.1 |
| 2004/0010358 A1 | 1/2004 | Oesterling et al. ........... 701/49 |
| 2004/0025115 A1 | 2/2004 | Sienel et al. ............... 715/513 |
| 2004/0044516 A1 | 3/2004 | Kennewick et al. .......... 704/5 |
| 2004/0098245 A1 | 5/2004 | Walker et al. ............... 704/1 |
| 2004/0117179 A1 | 6/2004 | Balasuriya ................. 704/231 |
| 2004/0117804 A1 | 6/2004 | Scahill et al. .............. 719/320 |
| 2004/0122674 A1 | 6/2004 | Bangalore et al. ......... 704/276 |
| 2004/0140989 A1 | 7/2004 | Papageorge ............... 345/700 |
| 2004/0158555 A1 | 8/2004 | Seedman et al. .............. 707/3 |
| 2004/0166832 A1 | 8/2004 | Portman et al. .......... 455/412.1 |
| 2004/0167771 A1 | 8/2004 | Duan et al. ................. 704/10 |
| 2004/0172258 A1 | 9/2004 | Dominach et al. ......... 704/277 |
| 2004/0193408 A1 | 9/2004 | Hunt ........................ 704/209 |
| 2004/0193420 A1 | 9/2004 | Kennewick et al. ........ 704/257 |
| 2004/0199375 A1 | 10/2004 | Ehsani et al. ................ 704/4 |
| 2004/0205671 A1 | 10/2004 | Sukehiro et al. ........... 715/532 |
| 2004/0243417 A9 | 12/2004 | Pitts, III et al. ............. 704/276 |
| 2005/0015256 A1 | 1/2005 | Kargman ................... 704/272 |
| 2005/0021334 A1 | 1/2005 | Iwahashi ................... 704/240 |
| 2005/0021470 A1 | 1/2005 | Martin et al. ................ 705/51 |
| 2005/0021826 A1 | 1/2005 | Kumar ...................... 709/232 |
| 2005/0033574 A1 | 2/2005 | Kim et al. ................. 704/251 |
| 2005/0033582 A1* | 2/2005 | Gadd et al. ............... 704/277 |
| 2005/0043940 A1 | 2/2005 | Elder .......................... 704/9 |
| 2005/0114116 A1 | 5/2005 | Fiedler ...................... 704/201 |
| 2005/0125232 A1 | 6/2005 | Gadd ..................... 704/270.1 |
| 2005/0131673 A1 | 6/2005 | Koizumi et al. ............. 704/2 |
| 2005/0137850 A1 | 6/2005 | Odell ......................... 704/4 |
| 2005/0137877 A1 | 6/2005 | Oesterling et al. ......... 704/275 |
| 2005/0143994 A1 | 6/2005 | Mori et al. ................ 704/235 |
| 2005/0216254 A1 | 9/2005 | Gupta et al. .................. 704/9 |
| 2005/0234727 A1 | 10/2005 | Chiu ...................... 704/270.1 |
| 2005/0246174 A1* | 11/2005 | DeGolia ................... 704/270 |
| 2005/0283752 A1 | 12/2005 | Fruchter et al. ............ 717/100 |
| 2006/0041431 A1 | 2/2006 | Maes ..................... 704/270.1 |
| 2006/0047509 A1 | 3/2006 | Ding et al. ................. 704/231 |
| 2006/0206310 A1 | 9/2006 | Ravikumar et al. ............ 704/9 |
| 2006/0217133 A1 | 9/2006 | Christenson et al. ........ 455/461 |
| 2006/0285662 A1 | 12/2006 | Yin et al. ................ 379/88.16 |
| 2007/0033005 A1 | 2/2007 | Cristo et al. .................. 704/9 |
| 2007/0033020 A1 | 2/2007 | (Kelleher) Francois et al. ........................ 704/226 |
| 2007/0038436 A1 | 2/2007 | Cristo et al. .................. 704/9 |
| 2007/0043569 A1 | 2/2007 | Potter, III et al. .......... 704/270 |
| 2007/0043574 A1 | 2/2007 | Coffman et al. ........... 704/275 |
| 2007/0043868 A1 | 2/2007 | Kumar et al. .............. 709/226 |
| 2007/0050191 A1 | 3/2007 | Weider et al. ............. 704/275 |
| 2007/0055525 A1 | 3/2007 | Kennewick et al. ........ 704/257 |
| 2007/0061067 A1 | 3/2007 | Zeinstra et al. ............ 701/200 |
| 2007/0061735 A1 | 3/2007 | Hoffberg et al. ........... 715/744 |
| 2007/0073544 A1 | 3/2007 | Millett et al. ............. 704/277 |
| 2007/0078708 A1 | 4/2007 | Yu et al. ..................... 705/14 |
| 2007/0078709 A1 | 4/2007 | Rajaram ..................... 705/14 |
| 2007/0118357 A1 | 5/2007 | Kasravi et al. .............. 704/10 |
| 2007/0135101 A1 | 6/2007 | Ramati et al. ............ 455/414.1 |
| 2007/0146833 A1 | 6/2007 | Satomi et al. ............. 358/537 |
| 2007/0162296 A1 | 7/2007 | Altberg et al. ............... 705/1 |
| 2007/0179778 A1 | 8/2007 | Gong et al. .................. 704/9 |
| 2007/0186165 A1 | 8/2007 | Maislos et al. ............. 715/728 |
| 2007/0198267 A1 | 8/2007 | Jones et al. ............... 704/257 |
| 2007/0203736 A1* | 8/2007 | Ashton ....................... 705/1 |
| 2007/0214182 A1 | 9/2007 | Rosenberg ............... 707/104.1 |
| 2007/0250901 A1 | 10/2007 | McIntire et al. ........... 725/146 |
| 2007/0265850 A1 | 11/2007 | Kennewick et al. ........ 704/257 |
| 2007/0299824 A1 | 12/2007 | Pan et al. .................... 707/3 |
| 2008/0034032 A1 | 2/2008 | Healey et al. ............. 709/203 |
| 2008/0065386 A1 | 3/2008 | Cross et al. ............... 704/270 |
| 2008/0091406 A1 | 4/2008 | Baldwin et al. ............... 704/4 |
| 2008/0103761 A1 | 5/2008 | Printz et al. .................. 704/9 |
| 2008/0109285 A1 | 5/2008 | Reuther et al. ............... 705/7 |
| 2008/0115163 A1 | 5/2008 | Gilboa et al. ............... 725/34 |
| 2008/0133215 A1 | 6/2008 | Sarukkai ..................... 704/2 |
| 2008/0140385 A1 | 6/2008 | Mahajan et al. .............. 704/9 |
| 2008/0147410 A1 | 6/2008 | Odinak .................... 704/270.1 |
| 2008/0154604 A1 | 6/2008 | Sathish et al. ............. 704/257 |
| 2008/0177530 A1 | 7/2008 | Cross et al. ................... 704/4 |
| 2008/0189110 A1 | 8/2008 | Freeman et al. ........... 704/251 |
| 2008/0235023 A1 | 9/2008 | Kennewick et al. ........ 704/257 |
| 2008/0235027 A1 | 9/2008 | Cross ..................... 704/270.1 |
| 2008/0319751 A1 | 12/2008 | Kennewick et al. ........ 704/257 |
| 2009/0052635 A1 | 2/2009 | Jones et al. .............. 379/88.02 |
| 2009/0067599 A1 | 3/2009 | Agarwal et al. .......... 379/114.21 |
| 2009/0076827 A1 | 3/2009 | Bulitta et al. .............. 704/275 |
| 2009/0106029 A1 | 4/2009 | DeLine et al. ............. 704/275 |
| 2009/0117885 A1 | 5/2009 | Roth ...................... 455/414.3 |
| 2009/0144271 A1 | 6/2009 | Richardson et al. ........... 707/5 |
| 2009/0150156 A1 | 6/2009 | Kennewick et al. ........ 704/257 |
| 2009/0171664 A1 | 7/2009 | Kennewick et al. ........ 704/257 |
| 2009/0216540 A1 | 8/2009 | Tessel et al. ............... 704/275 |
| 2009/0271194 A1 | 10/2009 | Davis et al. ............... 704/235 |
| 2009/0273563 A1 | 11/2009 | Pryor ........................ 345/157 |
| 2009/0276700 A1 | 11/2009 | Anderson et al. .......... 715/700 |
| 2009/0299745 A1 | 12/2009 | Kennewick et al. ........ 704/257 |
| 2009/0307031 A1 | 12/2009 | Winkler et al. ............... 705/7 |
| 2009/0313026 A1 | 12/2009 | Coffman et al. ........... 704/275 |
| 2010/0023320 A1 | 1/2010 | Di Cristo et al. .............. 704/9 |
| 2010/0029261 A1 | 2/2010 | Mikkelsen et al. .......... 455/419 |
| 2010/0036967 A1 | 2/2010 | Caine et al. ............... 709/236 |
| 2010/0049501 A1 | 2/2010 | Kennewick et al. ........... 704/9 |
| 2010/0049514 A1 | 2/2010 | Kennewick et al. ........ 704/233 |
| 2010/0057443 A1 | 3/2010 | Di Cristo et al. .............. 704/9 |
| 2010/0063880 A1 | 3/2010 | Atsmon et al. .......... 705/14.53 |
| 2010/0145700 A1 | 6/2010 | Kennewick et al. ........ 704/257 |
| 2010/0185512 A1 | 7/2010 | Borger et al. ............ 705/14.49 |
| 2010/0204986 A1 | 8/2010 | Kennewick et al. ........ 704/226 |
| 2010/0204994 A1 | 8/2010 | Kennewick et al. ........ 704/257 |
| 2010/0217604 A1 | 8/2010 | Baldwin et al. ............ 704/275 |
| 2010/0286985 A1 | 11/2010 | Kennewick et al. ........ 704/257 |
| 2010/0299142 A1 | 11/2010 | Freeman et al. .............. 704/9 |
| 2010/0312566 A1 | 12/2010 | Odinak et al. ............. 704/275 |
| 2011/0112827 A1 | 5/2011 | Kennewick et al. ............ 704/9 |

(56) References Cited

U.S. PATENT DOCUMENTS

| | | | |
|---|---|---|---|
| 2011/0112921 A1 | 5/2011 | Kennewick et al. | 705/26.1 |
| 2011/0131036 A1 | 6/2011 | Di Cristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101809 A1 | 4/2012 | Kennewick et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |
| 2012/0278073 A1 | 11/2012 | Weider et al. | 704/235 |
| 2013/0054228 A1 | 2/2013 | Baldwin et al. | 704/9 |
| 2013/0211710 A1 | 8/2013 | Kennewick et al. | 701/419 |
| 2013/0253929 A1 | 9/2013 | Weider et al. | 704/235 |
| 2013/0297293 A1 | 11/2013 | Di Cristo et al. | 704/9 |
| 2013/0304473 A1 | 11/2013 | Baldwin et al. | 704/257 |
| 2013/0339022 A1 | 12/2013 | Baldwin et al. | 704/257 |
| 2014/0108013 A1 | 4/2014 | Di Cristo et al. | 704/254 |
| 2014/0156278 A1 | 6/2014 | Kennewick et al. | 704/254 |

FOREIGN PATENT DOCUMENTS

| | | |
|---|---|---|
| JP | 2006-146881 | 6/2006 |
| JP | 2008-027454 | 2/2008 |
| JP | 2008-139928 | 6/2008 |
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International Class Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps- navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

Statement in Accordance with the Notice from the European Patent Office dated Oct. 1, 2007 Concerning Business Methods (OJ EPO Nov. 2007, 592-593), XP002456252.

\* cited by examiner

SYSTEM AND METHOD FOR DELIVERING TARGETED ADVERTISEMENTS AND TRACKING ADVERTISEMENT INTERACTIONS IN VOICE RECOGNITION CONTEXTS

CROSS-REFERENCE TO RELATED APPLICATIONS

This application is a continuation of Ser. No. 13/371,870, entitled "System and Method for Delivering Target Advertisements and Tracking Advertisement Interactions in Voice Recognition Context," filed Feb. 13, 2012 (which issued as U.S. Pat. No. 8,527,274 on Sep. 3, 2013), which is a continuation of U.S. patent application Ser. No. 12/847,564, entitled "System and Method for Selecting and Presenting Advertisements Based on Natural Language Processing of Voice-Based Input," filed Jul. 30, 2010 (which issued as U.S. Pat. No. 8,145,489 on Mar. 27, 2012), which is a continuation of U.S. patent application Ser. No. 11/671,526, entitled "System and Method for Selecting and Presenting Advertisements Based on Natural Language Processing of Voice-Based Input," filed Feb. 6, 2007 (which issued as U.S. Pat. No. 7,818,176 on Oct. 19, 2010), the contents of which are hereby incorporated by reference in their entirety.

FIELD OF THE INVENTION

The present invention relates to selecting and presenting advertisements based on natural language processing of voice-based input.

BACKGROUND OF THE INVENTION

As technology advances, consumer electronics devices tend to play larger roles due to increased functionality and mobility. For example, mobile phones, navigation devices, embedded devices, and other such devices provide a wealth of functionality beyond core applications. However, increased functionality adds difficulty to the learning curve associated with using electronic devices, and increased mobility intensifies the demand for simple mechanisms to interact with devices on the go. For example, existing systems tend to have complex human to machine interfaces, which may inhibit mass-market adoption for various technologies. For example, when a user wishes to perform a relatively simple task on a mobile phone, such as purchasing a ring tone, the user often is forced to navigate through a series of menus and press a series of buttons. In some instances, this may result in the transaction not necessarily occurring, as the user may prefer to avoid the hassles altogether. As such, there is ever-growing demand for ways to exploit technology in intuitive ways.

Voice recognition software may enable a user to exploit applications and features of a device that may otherwise be unfamiliar, unknown, or difficult to use. However, many existing voice user interfaces (when they actually work) still require significant learning on the part of the user. For example, users often cannot directly issue a request for a system to retrieve information or perform an action without having to memorize specific syntaxes, words, phrases, concepts, semantic indicators, or other keywords/qualifiers. Similarly, when users are uncertain of particular needs, many existing systems do not engage the user in a productive, cooperative dialogue to resolve requests and advance a conversation. Instead, many existing speech interfaces force users to use a fixed set commands or keywords to communicate requests in ways that systems can understand. Using existing voice user interfaces, there is virtually no option for dialogue between the user and the system to satisfy mutual goals.

The lack of adequate voice user interfaces results in missed opportunities for providing valuable and relevant information to users. Not only does this potentially leave user requests unresolved, in certain instances, providers of goods and services may lose out on potential business. In an increasingly global marketplace, where marketers are continually looking for new and effective ways to reach consumers, the problems with existing voice user interfaces leaves a large segment of consumer demand unfulfilled. Furthermore, existing techniques for marketing, advertising, or otherwise calling consumers to action fail to effectively utilize voice-based information, which is one of the most natural, intuitive methods of human interaction.

Existing systems suffer from these and other problems.

SUMMARY OF THE INVENTION

According to various aspects of the invention, a system and method for selecting and presenting advertisements based on natural language processing of voice-based inputs is provided. A natural language voice-based input may be received by a voice user interface. The voice-based input may include a user utterance, and a request may be identified from the utterance. Appropriate action may be taken to service the request, while one or more advertisements may be selected and presented to the user. Advertisements may be selected based on various criteria, including content of the input (e.g., concepts, semantic indicators, etc.), an activity related to the input (e.g., a relation to a request, a requested application, etc.), user profiles (e.g., demographics, preferences, location, etc.), or in other ways. A user may subsequently interact with the advertisement (e.g., via a voice-based input), and action may be taken in response to the interaction. Furthermore, the interaction may be tracked to build statistical profiles of user behavior based on affinities or clusters among advertisements, user profiles, contexts, topics, semantic indicators, concepts, or other criteria.

According to various aspects of the invention, advertisers may create advertisements, which may be stored in an advertisement repository. For example, advertisements may include sponsored messages, calls to action, purchase opportunities, trial downloads, or any other marketing communication, as would be apparent to those skilled in the art. Advertisers may specify various parameters to associate with the advertisements, such as various contexts or topic concepts (e.g., semantic indicators for a "music" concept may include words such as "music," "tunes," "songs," etc.), target demographics (e.g., a preferred audience), marketing criteria or prices for insertion (e.g., dynamic or static pricing based on various marketing criteria), or other information, as would be apparent. The advertisement repository may be associated with a server, where in response to a voice-based input from a user (e.g., at a voice-enabled device), a communications link may be established with the server. Information may be extracted from the voice-based input (e.g., words in the input, applications requested by the input, etc.), and the extracted information may be correlated with user profiles, advertisement parameters, or other information to determine which advertisements to select in relation to the voice-based input. The server may subsequently communicate the selected advertisements to the user, and the server may track the user's subsequent interaction with the selected advertisements.

DETAILED DESCRIPTION

Figure 1:
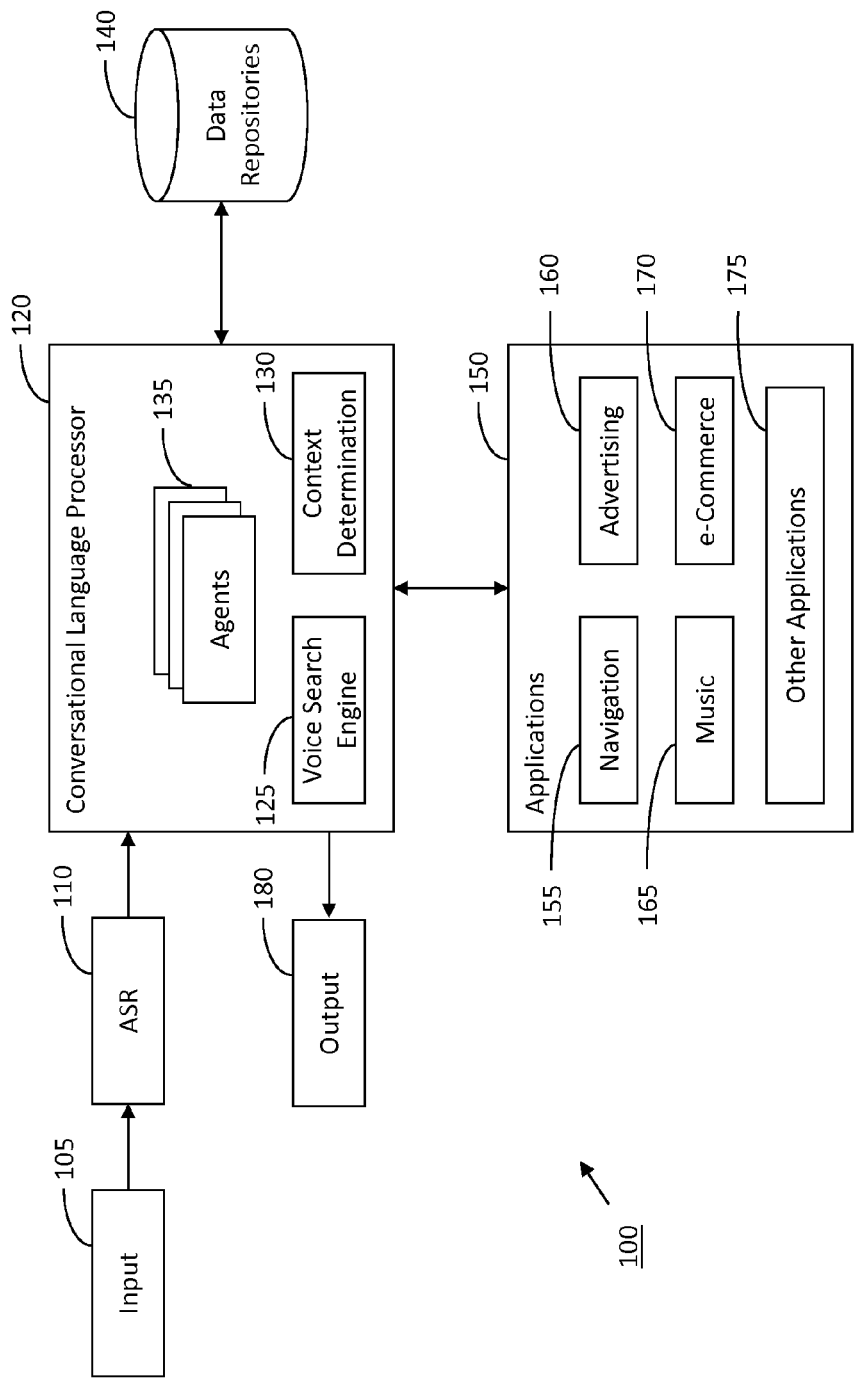
FIG. 1 illustrates a block diagram of an exemplary system for implementing a voice user interface according to various aspects of the invention.

Referring to FIG. 1, an exemplary system 100 for implementing a voice user interface is illustrated according to various aspects of the invention. System 100 may enable users to perform various tasks on a voice-enabled device. For example, users may control navigation devices, media devices, personal computers, personal digital assistants, or any other device supporting voice-based inputs. System 100 may enable users to request voice-enabled devices to retrieve information or perform various tasks, among other things, using natural language voice-based inputs. For example, system 100 may interpret natural language voice-based inputs and generate responses using, among other things, techniques described in U.S. patent application Ser. No. 10/452,147, entitled "Systems and Methods for Responding to Natural Language Speech Utterance," filed Jun. 3, 2003, which issued as U.S. Pat. No. 7,398,209 on Jul. 8, 2008, and U.S. patent application Ser. No. 10/618,633, entitled "Mobile Systems and Methods for Responding to Natural Language Speech Utterance," filed Jun. 15, 2003, which issued as U.S. Pat. No. 7,693,720 on Apr. 6, 2010, both of which are hereby incorporated by reference in their entirety. For example, as described in U.S. patent application Ser. No. 10/452,147, the system 100 may include a speech recognition engine (e.g., an Automatic Speech Recognizer 110) that may recognize words and phrases in an utterance using entries in one or more dictionary and phrase tables. In addition, as further described therein, fuzzy set possibilities or prior probabilities for the words in the dictionary and phrase tables may be dynamically updated to maximize the probability of correct recognition at each stage of the dialog (e.g., the probabilities or possibilities may be dynamically updated based on application domains, questions or commands, contexts, user profiles and preferences, user dialog histories, recognizer dictionary and phrase tables, word spellings, and/or other criteria).

According to various aspects of the invention, system 100 may receive a user input, including at least a voice-based user utterance, at an input device 105. Input device 105 may include any suitable device, or combination of devices, for receiving a voice-based input (e.g., a microphone). In various implementations, input device 105 may include a multi-modal input, such as a touch-screen interface, keypad, or other input. The received utterance may be processed by the Automatic Speech Recognizer 110. Automatic Speech Recognizer 110 may generate one or more preliminary interpretations of the utterance using various techniques. For example, Automatic Speech Recognizer 110 may interpret the utterance using techniques of phonetic dictation to recognize a stream of phonemes. Further, Automatic Speech Recognizer 110 may perform post-processing to enhance the preliminary interpretations. For example, Automatic Speech Recognizer 110 may vary interpretations of an utterance, or components of an utterance, from one context to another. Other techniques for enhancing an interpretation of a user utterance may be used, such as those described in U.S. patent application Ser. No. 11/513,269, entitled "Dynamic Speech Sharpening," filed Aug. 31, 2006, which issued as U.S. Pat. No. 7,634,409 on Dec. 15, 2009, and which is hereby incorporated by reference in its entirety.

The one or more preliminary interpretations may be provided to a conversational language processor 120. Conversational language processor 120 may include a voice search engine 125, a context determination module 130, and one or more agents 135, among other things, to enable cooperative, conversational interaction between the user and system 100. Conversational language processor 120 may be communicatively coupled to one or more data repositories 140 and one or more applications 150. Conversational language processor 120 may generate a domain-specific conversational response, which may be returned to the user as an output 180. Output 180 may include a multi-modal output (e.g., by simultaneously returning a voice-based response and displaying information on a display device).

System 100 may further include an interaction with one or more applications 150 to service one or more requests in the utterance. For example, the utterance may include one or more requests for performing an action, retrieving information, or various combinations thereof. Output 180 may include a conversational response to advance a conversation to service requests by invoking one or more applications 150, as appropriate. For example, applications 150 may include a navigation application 155, an advertising application 160, a music application, an electronic commerce application 170, and/or other applications 175. Furthermore, Automatic Speech Recognizer 110, conversational language processor 120, data repositories 140, and/or applications 150 may reside locally (e.g., on a user device), remotely (e.g., on a server), and/or hybrid local/remote processing models may be used (e.g., lightweight applications may be processed locally while computationally intensive applications may be processed remotely).

Conversational language processor 120 may build long-term and/or short-term shared knowledge in one or more knowledge sources. For example, shared knowledge sources may include information about previous utterances, requests, and other user interactions to inform generating an appropriate response to a current utterance. The shared knowledge may include public/non-private (i.e., environmental) knowledge, as well as personal/private (i.e., historical) knowledge. For example, conversational language processor 120 may use context determination module 130 to establish a context for a current utterance by having domain agents 135 competitively generate a context-based interpretation of the utterance (e.g., by scoring possible interpretations and selecting a highest scoring interpretation). As such, agents 135 may model various domains (e.g., navigation, music, a specific user, global users, advertising, e-commerce, etc.), and conversational language processor 120 may interpret and/or respond to a voice-based input accordingly. For example, context-based interpretations and responses to a voice-based input may be generated using techniques described in U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009, and U.S. patent application Ser. No. 11/212,693, entitled "Mobile Systems and Methods of Supporting Natural Language Human-Machine Interactions," filed Aug.

29, 2005, which issued as U.S. Pat. No. 7,949,529 on May 24, 2011, both of which are hereby incorporated by reference in their entirety.

Furthermore, conversational language processor 120 may support adaptive misrecognition to reinterpret a current utterance and/or one or more previous utterances. For example, information contained in a current utterance may indicate that interpretations for one or more previous utterances were incorrect, and therefore, the previous utterances may be reinterpreted to improve subsequent interpretations. Accordingly, conversational language processor 120 may use the techniques described herein, along with various other techniques, to interpret and respond to conversational, natural language utterances. Conversational language processor 120 may use various other techniques as will be apparent, such as those described in U.S. patent application Ser. No. 11/200,164, entitled "System and Method of Supporting Adaptive Misrecognition in Conversational Speech," filed Aug. 10, 2005, which issued as U.S. Pat. No. 7,620,549 on Nov. 17, 2009, and U.S. patent application Ser. No. 11/580,926, entitled "System and Method for a Cooperative Conversational Voice User Interface," filed Oct. 16, 2006, which issued as U.S. Pat. No. 8,073,681 on Dec. 6, 2011, both of which are hereby incorporated by reference in their entirety. For example, as described in U.S. patent application Ser. No. 11/200,164, an environmental model may be accessed to determine user location, user activity, track user actions, and/or other environmental information to invoke context, domain knowledge, preferences, and/or other cognitive qualities to enhance the interpretation of questions and/or commands. In addition, as further described therein, based on information received from a general cognitive model, the environmental model, and/or a personalized cognitive model, which provide statistical abstracts of user interaction patterns, the system 100 may enhance responses to commands and questions by including a prediction of user behavior.

Figure 2:
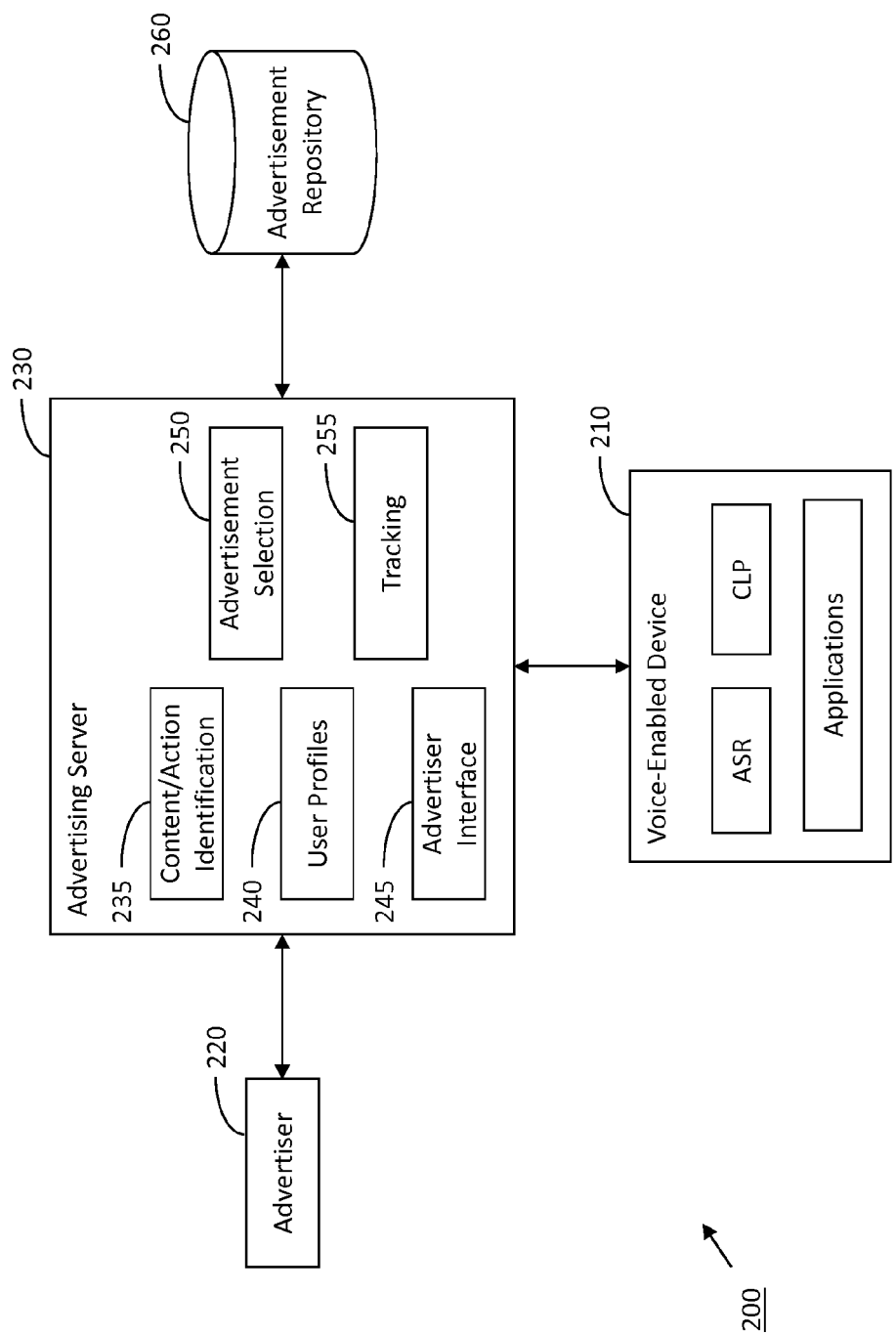
FIG. 2 illustrates a block diagram of an exemplary advertising system according to various aspects of the invention.

Referring to FIG. 2, an exemplary advertising system 200 is illustrated according to various aspects of the invention. System 200 may include a server 230 for receiving one or more advertisements from an advertiser 220, wherein the advertisements may be stored in a data repository 260 associated with server 230. For example, advertisements may include sponsored messages or marketing communications, calls to action, purchase opportunities, trial downloads, coupons, or any other suitable marketing, advertising, campaign, or other information, as would be apparent to those skilled in the art. A voice-enabled device 210 may receive a voice-based input and establish communications with advertising server 230. Subsequently, advertising server 230 may select one or more advertisements from among the advertisements stored in data repository 260, and the selected advertisements may be provided to the voice-enabled device for presentation to a user.

Advertiser 220 may access advertising server 230 via an advertiser interface 245. Advertisers 220 may upload targeted advertisements to server 230 via advertiser interface 245, and server 230 may store the advertisements in data repository 260. The advertisements may include graphically-based advertisements that include banners, images, audio, video, or any suitable combination thereof. Furthermore, the advertisements may include interactive or embedded information, such as links, metadata, or computer-executable instructions, or any suitable combination thereof. Advertisers may specify criteria for a campaign or targeting information for an advertisement (e.g., a start date, an end date, budget information, geotargeting information, conceptual or contextual information, or any other suitable criteria), which may be used to facilitate selecting an advertisement in relation to a particular voice-based input.

In addition to providing interface 245 for advertisers, server 230 may include a content/action identification module 235, a user profile module 240, an advertisement selection module 250, and a tracking module 255. Users may submit voice-based requests to voice-enabled device 210, and voice-enabled device 210 may communicate information about the voice-based input to server 230. Server 230 may invoke advertisement selection module 250 to extract relevant information from the voice-based input, where advertisement selection module 250 may select one or more advertisements relevant to the voice-based input based on information extracted using content/action identification module 235 and/or user profile module 240.

For example, content/action identification module 235 may identify content of the voice-based input (e.g., words in the input), requested information (e.g., search results, a web page, music, video, graphics, or other information), requested actions (e.g., calculating a navigation route, placing a telephone call, playing a song, etc.), a category or topic related to the input (e.g., music, business, stocks, sports, navigation, movies, etc.), or other criteria to use in selecting an advertisement. Further, user profile module 240 may identify characteristics of a specific user (e.g., demographics, personal preferences, location-based information, etc.), global user profiles (e.g., demographic profiles, click-through rates, etc.), or other criteria to use in selecting an advertisement. Moreover, advertisement selection module 250 may account for where a request originates from. For example, advertisements may be selected based on a default user location (e.g., identified from a user profile), current geolocation information (e.g., identified from a navigation device), whether an affiliate or partner of server 230 initiated the request, or other criteria.

For instance, a user may request airline reservations via voice-enabled device 210, and content/action identification module 235 may identify specific words used in the request, a category related to the request (e.g., travel, airlines, hotels, etc.), or other information. Furthermore, user profile module 240 may identify relevant characteristics of the user (e.g., user-specific demographics, location information, preferred airlines or hotels, etc.), as well as global user characteristics (e.g., most popular airlines). In various implementations, advertisements may be selected by assigning a score to each advertisement (e.g., based on click-through rates, relevance metrics, target audiences, etc.). As such, advertisement selection module 250 may correlate the information about the request to select advertisements stored in data repository 260, and server 230 may communicate the selected advertisements to voice-enabled device 210. Furthermore, selected advertisements may be presented according to a predetermined ordering or ranking (e.g., based on a ranking of relevance to an advertisement).

In various implementations, advertisement selection module 250 may retrieve a predetermined number of advertisements for any given request. Furthermore, the selected advertisements may depend upon a presentation format. For example, advertisements may be selected based on an amount of available space on a display of voice-enabled device 210 and/or a size/shape of the selected advertisements. In another example, voice-based advertisements may be selected and presented to the user audibly (e.g., a "hands-free" advertisement may be preferred when voice-enabled device 210 is a telematics device).

Furthermore, the user's subsequent interaction with an advertisement may be tracked using tracking module 255. For example, tracking module 255 may determine whether a conversion or click-through occurs for each advertisement presented to users. Further, tracking module 255 may maintain accounting and/or billing information associated with advertisers 220. For example, advertisers 220 may specify a maximum insertion cost, a cost-per-click-through, an average insertion cost, or other criteria specifying a budget constraint for an advertisement. As such, tracking module 255 may track which advertisements are selected and/or presented, which advertisements result in a conversion or click-through, whether a click-through or conversion results in a transaction or sale, associations between advertisements and users, requests, concepts, semantic indicators, and/or other criteria. For example, tracking user interaction with advertisements may be used to build user-specific and/or global statistical profiles that map or cluster advertisements to topics, semantic indicators, contexts, concepts, etc. based on user behavior, demographics, targeting constraints, content of advertisements, content of requests, actions associated with requests, or other statistically relevant information. Accordingly, the tracking information may be used to bill or invoice advertisers 220, as well as to improve subsequent performance and relevance of advertisements selected using advertisement selection module 250. Other techniques and features of selecting and presenting advertisements based on voice-based inputs may suitably be employed, as would be apparent.

Figure 3:
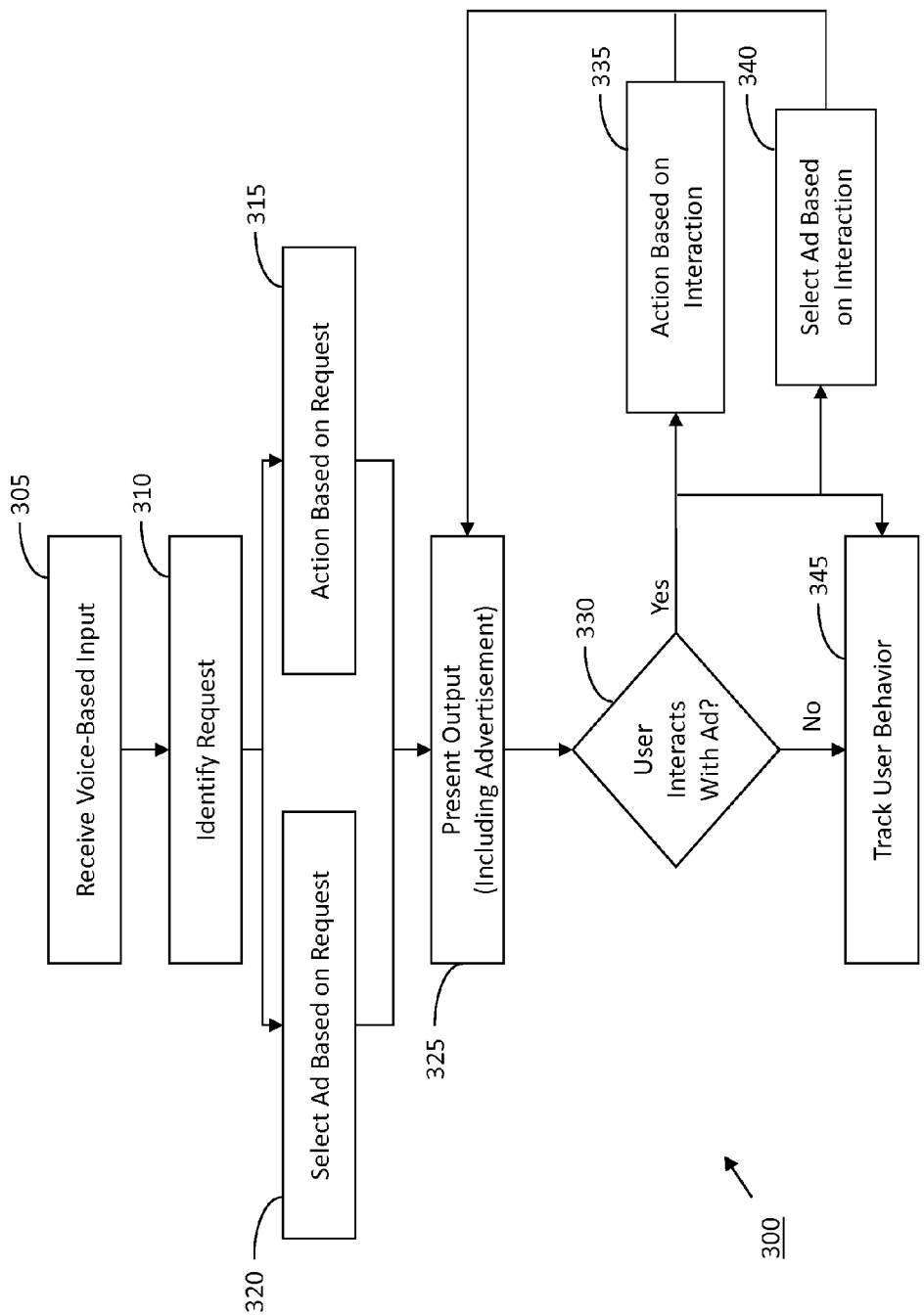
FIG. 3 illustrates a flow diagram of an exemplary method for selecting and presenting advertisements based on voice-based inputs according to various aspects of the invention.

Referring to FIG. 3, an exemplary method for selecting and presenting advertisements based on a voice-based input is illustrated according to various aspects of the invention. The method may begin in an operation 305, where a voice-based input, including at least a user utterance, may be received at a voice user interface. The voice user interface may include any suitable mechanism for receiving the utterance (e.g., a microphone), and may interface with any suitable voice-enabled device, as would be apparent, including personal navigation devices, personal digital assistants, media devices, telematics devices, personal computers, mobile phones, or others.

Subsequently, one or more requests included in the voice-based input may be identified in an operation 310. For example, the requests may include requests to retrieve information, perform tasks, explore or gather information, or otherwise interact with a system or device. For example, a voice-based input to a navigation device may include a request to calculate a route or retrieve location-based information. In another example, a voice-based input to a mobile phone may include a request to place a telephone call, purchase a ringtone, or record a voice-memo. Furthermore, in various implementations, voice-based inputs may include multiple requests, multi-modal requests, cross-device requests, cross-application requests, or other types of requests. For example, an utterance received in operation 305 may be: "Get me a route to Chang's Restaurant, and call them so I can make a reservation." The utterance may thus include multiple requests, including cross-device requests (e.g., calculate a route using a navigation device, and make a telephone call using a mobile phone), as well as cross-application requests (e.g., search for an address and/or phone number using a voice search engine, and calculate a route using a navigation application).

The requests may be part of a conversational interaction between a user and a system or device, whereby an interpretation of requests in a current utterance may be based upon previous utterances in a current conversation, utterances in previous conversations, context-based information, local and/or global user profiles, or other information. For example, a previous request may be reinterpreted based on information included in subsequent requests, a current request may be interpreted based on information included in previous requests, etc. Furthermore, the conversational interaction may take various forms, including query-based conversations, didactic conversations, exploratory conversations, or other types of conversations. For example, the conversational language processor may identify a type of conversation, and information may be extracted from the utterance accordingly to identify the one or more requests in operation 310. Moreover, the conversational language processor may determine whether any of the requests are incomplete or ambiguous, and action may be taken accordingly (e.g., a system response may prompt a user to clarify an incomplete and/or ambiguous request). The conversational language processor may therefore use various techniques to identify a conversation type, interpret utterances, identify requests, or perform other tasks, such as those described in the aforementioned U.S. Patent Applications and U.S. Patents, which are hereby incorporated by reference in their entirety.

Upon identifying the one or more requests, action may be taken based on the identified requests in an operation 315, while one or more advertisements may be selected in an operation 320 (described in greater detail below). For example, one or more context-appropriate applications may be invoked to service the requests in operation 315 (e.g., a voice search engine, a navigation application, an electronic commerce application, or other application may be invoked depending upon the request). Furthermore, in operation 320, information may be communicated to an advertising server to select one or more advertisements related to the request. Thus, as shown in FIG. 3, taking action in operation 315 and selecting advertisements in operation 320 may be related operations (e.g., advertisements may be selected to help in interpreting incomplete and/or ambiguous requests).

Upon taking action in operation 315 (e.g., to service the request) and selecting one or more advertisements in operation 320 (e.g., in relation to the request), an output may be presented to the user in operation 325. The output may indicate a result of the action associated with operation 315. For example, the output may include requested information, an indication of whether a requested task was successfully completed, whether additional information is needed to service the request (e.g., including a prompt for the information), or other information relating to an action based on the request. Furthermore, the output may include advertisements, as selected in operation 320. For example, the output may include text-based, graphic-based, video-based, audio-based, or other types of advertisements, as would be apparent to those skilled in the art. Further, the output may include other types of advertisements, including calls to action (e.g., a location-based coupon or purchase opportunity, trial downloads, or other actionable advertising or marketing).

Advertisements may be selected in relation to a request based on various criteria. For example, an advertisement may be selected based on words or other content of the request, relevant words or content related to the words or content of the request, etc. In another example, the advertisement may be selected based on requested tasks/information (e.g., a request for movie showtimes may result in an advertisement being selected for a particular theater). In yet another example, the advertisement may be selected based on a topic or category associated with the requested tasks/information (e.g., a request to purchase airline tickets may result in an advertisement being selected for a hotel in a destination associated with a reserved flight). In still other examples, the advertisement may be selected based on location information, (e.g., advertisements may be selected based on a proximity to a user geolocation identified using a navigation device), user-specific and/or global user profiles (e.g., advertisements may be selected based on user-specific and/or global preferences, advertiser campaign criteria, etc.).

Content of a voice-based input may be determined based on various criteria, including contextual or conceptual information (e.g., semantic indicators, qualifiers, or other information). For example, a given concept may include various semantically equivalent indicators having an identical meaning. Thus, for instance, a voice-based input may be "Play some tunes!" or "Play some music!" or other variants thereof, each of which may be interpreted as relating to a specific idea (or concept) of "Music." Thus, concept or content information in a request may be used to select an advertisement. For example, a user may request to calculate a route in Seattle, Wash. (e.g., "How do I get to the Space Needle?"). Based on a context of the requested task (e.g., "Navigation," "Seattle," etc.), a voice search engine may retrieve an address of the Space Needle and a navigation application may calculate the route. Furthermore, user profile information may indicate that the user is visiting Seattle from out-of-town (e.g., the profile may indicate that the user's home is Sacramento), and therefore, an advertisement for popular points-of-interest in Seattle may be selected. In another example, the user may request information about a sporting event (e.g., "Get me the kickoff time for the Eagles game on Sunday"). Based on a context of the requested information (e.g., "Search," "Sports," "Philadelphia," etc.), the requested information may be retrieved, while an advertisement for Eagles apparel or memorabilia may be selected.

In various instances, concepts, semantic indicators, qualifiers, or other information included in, or inferred from, a request may indicate an exploratory nature for the request. In other words, the exploratory request may identify a goal for a conversation, instead of a particular task to perform or information to retrieve. As such, in various implementations, an advertisement may be selected in operation 320 in an effort to advance the conversation towards the goal. For example, an exploratory request may include a request for a navigation route (e.g., "I feel like going to a museum, find me something interesting"). Based on a context of the requested task (e.g., "Navigation," "Points of Interest," etc.), the goal of the conversation may be identified, and the request may be serviced in operation 315 (e.g., a voice search engine may locate nearby points of interest based on user preferred topics). Further, the advertising application may select an appropriate advertisement in operation 320, where the advertisement may be selected in an attempt to advance the conversation towards the goal. For example, statistical profiles (e.g., user profiles, global profiles, topic-based profiles, etc.) may reflect an affinity between an advertisement for a particular museum and other users sharing similar demographics or other characteristics with the requesting user. Thus, in addition to retrieving information about museums in operation 315, an advertisement for a museum likely to be of interest to the user may be selected in operation 320.

In various instances, a request may include incomplete, ambiguous, unrecognized, or otherwise insufficient semantic indicators, context, qualifiers, or other information needed to identify the request. In other words, the request may include inadequate information to identify or infer a task to perform, information to retrieve, or a goal for a conversation. Thus, as much information as possible may be extracted and/or inferred from the request based on shared knowledge such as context, user or global profile information, previous utterances, previous conversations, etc. As such, servicing the request may include generating a response and/or communicating with an advertising application to advance a conversation toward a serviceable request. For example, servicing the request in operation 315 and selecting an advertisement in operation 320 may include generating a response and/or selecting an advertisement to frame a subsequent user input, thereby advancing the conversation.

For example, the request may include incomplete, ambiguous, or unrecognized information (e.g., "Do you know [mumbled words] Seattle?"). A context of the requested task may be identified (e.g., "Seattle"), yet the identified context may be insufficient to adequately take action to service the request. Additional information may be inferred based on previous utterances in the conversation, profile information, or other information. However, when the additional information fails to provide adequate information to infer a reasonable hypothesis, servicing the request in operation 315 may include generating a response to frame a subsequent user input and advance the conversation (e.g., information about various topics may be retrieved based on a user's preferred topics). Further, the advertising application may select an advertisement in operation 320 to advance the conversation (e.g., advertisements may be selected based on user and/or global profiles reflecting an affinity between certain advertisements associated with Seattle and user preferences, profiles, etc.). Thus, by selecting an advertisement, indicating dissatisfaction with an advertisement, or otherwise interacting with an advertisement, the interaction may be used to build context and shared knowledge for a subsequent course of the conversation. For example, a user may select an advertisement, and an interpretation of a subsequent voice-based input (e.g., "Call them," "What's the price range?" etc.) may be interpreted with shared knowledge of the advertisement that the voice-based input relates to. Thus, advertisements may be used in a way that enables advertisers to market to consumers, while also improving the consumers' interaction with a device. Other advantages will be apparent to those skilled in the art.

It will be apparent that operation 320 may use various techniques to select advertisements based on voice-based inputs and/or requests included therein. For example, an advertiser may specify a target audience, marketing criteria, campaign strategies, budget constraints, concepts, semantic indicators, related topics, categories, and/or any other suitable information to associate with an advertisement. For instance, advertisers may pay a premium to prioritize an advertisement in relation to similar advertisements (e.g., advertisements associated with competitors). In another example, various statistical profiles may define affinities between advertisements, topics, users, etc. (e.g., based on click-through or conversion rates, or other tracking information, as described in more detail below). Thus, advertisements may be selected in operation 320 using various techniques, including content of the request, an activity/action associated with the request, user profiles, user preferences, statistical metrics, advertiser-specified criteria, to advance a conversation, to resolve ambiguous requests, or in various other ways, as will be apparent.

The output presented to the user in operation 325 may be provided to the user in various ways. For example, in various implementations, the output may include a voice-based or otherwise audible response. In another example, when an associated device includes a display mechanism, the output may be displayed on the display device. It will be apparent that many combinations or variants thereof may be used, such as augmenting a voice-based response with information on a display device. For example, a user may request information about restaurants, and an advertisement may be selected based on a user preference indicating a favorite type of restaurant (e.g., a Chinese restaurant may be selected based on a user profile indicating a preference for Chinese). Therefore, in one example, the output presented in operation 325 may display information about various restaurants matching the requested information, while a voice-based advertisement for the Chinese restaurant may be played to the user (e.g., via a speaker or other suitable mechanism for playing voice back to the user). Many other variations will be apparent (e.g., a graphical advertisement may be displayed on a display device, while a corresponding or different voice-based advertisement may be played audibly).

Subsequent interaction between the user and the presented advertisements may be monitored in a decisional operation 330. For instance, when the user elects to interact with the advertisement, action may be taken based on the interaction in an operation 335. The interaction may take various forms, including additional voice-based inputs or other suitable mechanisms for interacting with advertisements (e.g., clicking on an advertisement displayed on a personal digital assistant using an associated stylus). For example, a user may initially request information from a voice-enabled media device (e.g., a satellite radio player) about a song currently playing (e.g., "What is this song?"). In addition to outputting the requested information about the song (e.g., "This song is Double Barrel by Dave and Ansel Collins."), a selected advertisement may enable the user to purchase a ringtone for a mobile phone that corresponds to the song. In this example, the interaction may include a request to purchase the ringtone (e.g., "Yeah, I'll buy that"), and action taken in operation 335 may include completing a transaction for the ringtone and/or downloading the ringtone to the mobile phone. Furthermore, additional advertisements may be selected in an operation 340 based on the interaction, using similar techniques as described in connection with operation 320 (e.g., advertisements for additional ringtones, similar musicians, etc. may be selected). Processing may subsequently return to operation 325 to present output resulting from the interaction.

User advertisement interaction may be tracked in an operation 345. For example, operation 345 may track historical data about users, conversations, topics, contexts, or other criteria to associate information with the selected advertisement. The tracking information may therefore be used to build statistical profiles defining affinities, click-through or conversion rates, or other information about various advertisements, topics, or other criteria on a user-specific and/or a global-user level. Thus, clusters or mappings may be created between advertisements, topics, concepts, demographics, or other criteria based on user behavior with the advertisements (e.g., whether a user interacts with the advertisement in operation 330).

For instance, certain advertisements may experience high click-through rates in relation to a first context and/or topic, but low click-through rates in relation to a second context and/or topic, and therefore, when requests relate to the first context and/or topic, the advertisement may be more likely to be selected in subsequent operations 320/340. In another example, global statistical profiles may indicate that an advertisement experiences more click-throughs by users of a particular demographic, and therefore, the advertisement may be more likely to be selected for users falling within the demographic. Many different techniques for tracking and building statistical profiles will be apparent.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be apparent to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

performing, by the one or more physical processors, speech recognition to recognize one or more words of the second natural language utterance;

determining, by the one or more physical processors, domain information for the one or more recognized words based on the first natural language utterance;

processing, by the one or more physical processors, based on the domain information, the one or more recognized words to determine an interpretation of the second natural language utterance, wherein processing the one or more recognized words comprises:

providing the one or more recognized words to a first domain agent associated with a first domain and a second domain agent associated with a second domain;

obtaining a first interpretation of the second natural language utterance from the first domain agent;

obtaining a second interpretation of the second natural language utterance from the second domain agent; and determining the interpretation based on one or more of the first interpretation or the second interpretation;

determining, by the one or more physical processors, promotional content based on the interpretation; and
presenting, by the one or more physical processors, the promotional content to a user.

2. The method of claim 1, wherein the first natural language utterance and the second natural language utterance are received during an interactive session between the user and the computer system, the method further comprising:
determining, by the one or more physical processors, an activity relating to one or more of the first natural language utterance or the second natural language utterance,
wherein determining the promotional content comprises determining the promotional content based on the activity.

3. The method of claim 1, further comprising:
determining, by the one or more physical processors, context information for the one or more recognized words based on the first natural language utterance,
wherein the interpretation is determined further based on the context information.

4. The method of claim 1, wherein the first interpretation is determined by the first domain agent based on the first domain, and wherein the second interpretation is determined by the second domain agent based on the second domain.

5. The method of claim 1, further comprising:
associating, by the one or more physical processors, the first interpretation with a first interpretation score; and
associating, by the one or more physical processors, the second interpretation with a second interpretation score,
wherein determining the interpretation comprises determining the first interpretation as the interpretation based on the first interpretation score and the second interpretation score.

6. The method of claim 5, wherein the first interpretation is determined as the interpretation based on the first interpretation score being greater than the second interpretation score.

7. The method of claim 1, further comprising:
receiving, at the one or more physical processors, a third natural language utterance relating to one or more of the first natural language utterance or the second natural language utterance; and
determining, by the one or more physical processors, an interpretation of the third natural language utterance based on the promotional content.

8. The method of claim 7, wherein the first natural language utterance, the second natural language utterance, and the third natural language utterance are received during an interactive session between the user and the computer system.

9. The method of claim 8, wherein the third natural language utterance is received after the second natural language utterance.

10. The method of claim 7, further comprising:
performing, by the one or more physical processors, speech recognition to recognize one or more words of the third natural language utterance, wherein the one or more recognized words of the third natural language utterance include one or more reference words;
determining, by the one or more physical processors, that the one or more reference words refer to an item associated with the promotional content; and
initiating, by the one or more physical processors, a purchase transaction associated with the item based on the determination that the one or more reference words refer to the item.

11. The method of claim 10, wherein the item includes a purchasable good.

12. The method of claim 7, further comprising:
initiating, by the one or more physical processors, based on the interpretation of the third natural language utterance, a purchase transaction associated with the promotional content.

13. The method of claim 1, wherein the first natural language utterance and the second natural language utterance are received during an interactive session between the user and the computer system, the method further comprising:
receiving, at the one or more physical processors, a third natural language utterance during the interactive session; and
processing, by the one or more physical processors, based on the third natural language utterance, the one or more recognized words to determine a reinterpretation of the second natural language utterance.

14. The method of claim 13, wherein determining the promotional content comprises determining the promotional content based on the reinterpretation.

15. The method of claim 13, wherein determining the promotional content comprises determining the promotional content based on the interpretation, the method further comprising:
determining, by the one or more physical processors, other promotional content based on the reinterpretation; and
presenting, by the one or more physical processors, the other promotional content to the user.

16. The method of claim 1, further comprising:
identifying, by the one or more physical processors, one or more requests associated with the second natural language utterance,
wherein determining the promotional content comprises obtaining the promotional content based on a determination that the promotional content relates to the one or more requests.

17. The method of claim 16, further comprising:
determining, by the one or more physical processors, one or more activities in the one or more requests; and
performing, by the one or more physical processors, the one or more activities,
wherein determining the promotional content comprises determining the promotional content based on the one or more activities.

18. The method of claim 17, wherein determining the one or more activities comprises determining a call to be initiated for the user in response to the one or more requests, wherein performing the one or more activities comprises initiating the call for the user, and wherein determining the promotional content comprises determining the promotional content based on the call.

19. The method of claim 17, wherein determining the one or more activities comprises determining a navigation route to be calculated for the user in response to the one or more requests, wherein performing the one or more activities comprises calculating the navigation route for the user, and wherein determining the promotional content comprises determining the promotional content based on the navigation route.

20. The method of claim 17, wherein determining the one or more activities comprise determining a media item to be presented in response to the one or more requests, wherein performing the one or more activities comprises presenting the media item to the user, and wherein determining the promotional content comprises determining the promotional content based on the media item, the promotional content being different than the media item.

21. The method of claim 17, wherein determining the one or more activities comprises determining a reservation to be made on behalf of the user in response to the one or more requests, and wherein determining the promotional content comprises determining the promotional content based on information relating to the reservation.

22. The method of claim 17, wherein determining the one or more activities comprises determining a first reservation to be made on behalf of the user in response to the one or more requests, and wherein determining the promotional content comprises determining the promotional content based on information relating to a second reservation that is an alternative to the first reservation.

23. The method of claim 17, further comprising:
receiving, at the one or more physical processors, a third natural language utterance relating to one or more of the first natural language utterance or the second natural language utterance;
determining, by the one or more physical processors, an interpretation of the third natural language utterance based on the promotional content; and
initiating, by the one or more physical processors, based on the interpretation of the third natural language utterance, a purchase transaction associated with the promotional content.

24. The method of claim 16, further comprising:
determining, by the one or more physical processors, that at least one request of the one or more requests is incomplete or ambiguous;
monitoring, by the one or more physical processors, interaction of the user with the promotional content; and
interpreting, by the one or more physical processors, the at least one incomplete or ambiguous request based on the interaction.

25. The method of claim 16, wherein the one or more requests include a first request associated with a first application and a second request associated with a second application different than the first application, and wherein the promotional content relates to one or more of the first request or the second request.

26. The method of claim 25, wherein a first application type of the first application includes one or more of a navigation application, a music application, a commerce application, or a calling application, and wherein the second application is of an application type different than the first application type.

27. The method of claim 16, wherein the one or more requests include a first request to be processed by a first device associated with the user and a second request to be processed by a second device associated with the user, and wherein the promotional content relates to one or more of the first request or the second request.

28. The method of claim 27, wherein a first device type of the first device includes one or more of a mobile phone, a navigation device, or a media player device, and wherein the second device is of a device type different than the first device type.

29. The method of claim 27, wherein the first device and the second device are operably independent of one another.

30. The method of claim 1, further comprising:
obtaining, by the one or more physical processors, user profile information associated with the user, wherein the user profile information specifies prior user interactions with items; and
identifying, by the one or more physical processors, categories of items based on the prior user interactions specified by the user profile information,
wherein determining the promotional content comprises determining a promotional item associated with one of the categories.

31. The method of claim 1, further comprising:
obtaining, by the one or more physical processors, user profile information associated with the user, wherein the user profile information specifies prior user interactions with items;
identifying, by the one or more physical processors, one or more requests associated with the first natural language utterance or the second natural language utterance;
determining, by the one or more physical processors, one or more applications for processing the one or more requests; and
identifying, by the one or more physical processors, categories of items based on the prior user interactions specified by the user profile information, wherein the categories relate to the one or more applications,
wherein determining the promotional content comprises determining a promotional item associated with one of the categories.

32. A system for providing promotional content related to one or more natural language utterances and/or responses, the system comprising:
one or more physical processors programmed to execute one or more computer program instructions which, when executed, cause the one or more physical processors to:
receive a first natural language utterance;
provide a response to the first natural language utterance;
receive a second natural language utterance relating to the first natural language utterance;
perform speech recognition to recognize one or more words of the second natural language utterance;
determine domain information for the one or more recognized words based on the first natural language utterance;
process, based on the domain information, the one or more recognized words to determine an interpretation of the second natural language utterance, wherein processing the one or more recognized words comprises:
providing the one or more recognized words to a first domain agent associated with a first domain and a second domain agent associated with a second domain;
obtaining a first interpretation of the second natural language utterance from the first domain agent;
obtaining a second interpretation of the second natural language utterance from the second domain agent; and
determining the interpretation based on one or more of the first interpretation or the second interpretation;
determine promotional content based on the interpretation; and
present the promotional content to a user.

33. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance during an interactive session between a user and the computer system;

providing, by the one or more physical processors, a response to the first natural language utterance;

receiving, at the one or more physical processors, a second natural language utterance relating to the first natural language utterance during the interactive session;

performing, by the one or more physical processors, speech recognition to recognize one or more words of the second natural language utterance;

processing, by the one or more physical processors, based on the first natural language utterance, the one or more recognized words to determine an interpretation of the second natural language utterance;

receiving, at the one or more physical processors, a third natural language utterance during the interactive session;

processing, by the one or more physical processors, based on the third natural language utterance, the one or more recognized words to determine a reinterpretation of the second natural language utterance;

determining, by the one or more physical processors, promotional content based on one or more of the interpretation or the reinterpretation; and presenting, by the one or more physical processors, the promotional content to the user.

34. The method of claim 33, wherein determining the promotional content comprises determining the promotional content based on the reinterpretation.

35. The method of claim 33, wherein determining the promotional content comprises determining the promotional content based on the interpretation, the method further comprising:

determining, by the one or more physical processors, other promotional content based on the reinterpretation; and presenting, by the one or more physical processors, the other promotional content to the user.

36. A system for providing promotional content related to one or more natural language utterances and/or responses, the system comprising:

one or more physical processors programmed to execute one or more computer program instructions which, when executed, cause the one or more physical processors to:

receive a first natural language utterance during an interactive session between a user and the system;

provide a response to the first natural language utterance;

receive a second natural language utterance relating to the first natural language utterance during the interactive session;

perform speech recognition to recognize one or more words of the second natural language utterance;

process, based on the first natural language utterance, the one or more recognized words to determine an interpretation of the second natural language utterance;

receive a third natural language utterance during the interactive session;

process, based on the third natural language utterance, the one or more recognized words to determine a reinterpretation of the second natural language utterance;

determine promotional content based on one or more of the interpretation or the reinterpretation; and present the promotional content to the user.

37. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

identifying, by the one or more physical processors, one or more requests associated with the second natural language utterance;

determining, by the one or more physical processors, that at least one request of the one or more requests is incomplete or ambiguous;

determining, by the one or more physical processors, promotional content that relates to the one or more requests;

presenting, by the one or more physical processors, the promotional content to a user;

monitoring, by the one or more physical processors, interaction of the user with the promotional content; and interpreting, by the one or more physical processors, the at least one incomplete or ambiguous request based on the interaction.

38. A system for providing promotional content related to one or more natural language utterances and/or responses, the system comprising:

one or more physical processors programmed to execute one or more computer program instructions which, when executed, cause the one or more physical processors to:

receive a first natural language utterance;

provide a response to the first natural language utterance;

receive a second natural language utterance relating to the first natural language utterance;

identify one or more requests associated with the second natural language utterance;

determine that at least one request of the one or more requests is incomplete or ambiguous;

determine promotional content that relates to the one or more requests;

present the promotional content to a user;

monitor interaction of the user with the promotional content; and interpret the at least one incomplete or ambiguous request based on the interaction.

39. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

identifying, by the one or more physical processors, requests associated with the second natural language utterance, wherein the requests include a first request associated with a first application and a second request associated with a second application different than the first application;

determining, by the one or more physical processors, promotional content that relates to one or more of the first request or the second request; and presenting, by the one or more physical processors, the promotional content to a user.

40. The method of 39, wherein a first application type of the first application includes one or more of a navigation application, a music application, a commerce application, or a calling application, and wherein the second application is of an application type different than the first application type.

41. The method of claim 39, further comprising:

receiving, at the one or more physical processors, a third natural language utterance relating to one or more of the first natural language utterance or the second natural language utterance; and determining, by the one or more physical processors, an interpretation of the third natural language utterance based on the promotional content.

42. The method of claim 41, further comprising:

initiating, by the one or more physical processors, based on the interpretation of the third natural language utterance, a purchase transaction associated with the promotional content.

43. A system for providing promotional content related to one or more natural language utterances and/or responses, the system comprising:

one or more physical processors programmed to execute one or more computer program instructions which, when executed, cause the one or more physical processors to:

receive a first natural language utterance;

provide a response to the first natural language utterance;

receive a second natural language utterance relating to the first natural language utterance;

identify requests associated with the second natural language utterance, wherein the requests include a first request associated with a first application and a second request associated with a second application different than the first application;

determine promotional content that relates to one or more of the first request or the second request; and present the promotional content to a user.

44. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

identifying, by the one or more physical processors, requests associated with the second natural language utterance, wherein the requests include a first request to be processed by a first device associated with a user and a second request to be processed by a second device associated with the user;

determining, by the one or more physical processors, promotional content that relates to one or more of the first request or the second request; and presenting, by the one or more physical processors, the promotional content to the user.

45. The method of claim 44, wherein a first device type of the first device includes one or more of a mobile phone, a navigation device, or a media player device, and wherein the second device is of a device type different than the first device type.

46. The method of claim 44, wherein the first device and the second device are operably independent of one another.

47. The method of claim 44, further comprising:

receiving, at the one or more physical processors, a third natural language utterance relating to one or more of the first natural language utterance or the second natural language utterance; and determining, by the one or more physical processors, an interpretation of the third natural language utterance based on the promotional content.

48. The method of claim 47, further comprising:

initiating, by the one or more physical processors, based on the interpretation of the third natural language utterance, a purchase transaction associated with the promotional content.

49. A system for providing promotional content related to one or more natural language utterances and/or responses, the system comprising:

one or more physical processors programmed to execute one or more computer program instructions which, when executed, cause the one or more physical processors to:

receive a first natural language utterance;

provide a response to the first natural language utterance;

receive a second natural language utterance relating to the first natural language utterance;

identify requests associated with the second natural language utterance, wherein the requests include a first request to be processed by a first device associated with a user and a second request to be processed by a second device associated with the user;

determine promotional content that relates to one or more of the first request or the second request; and present the promotional content to the user.

50. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

obtaining, by the one or more physical processors, user profile information associated with a user, wherein the user profile information specifies prior user interactions with items;

identifying, by the one or more physical processors, categories of items based on the prior user interactions specified by the user profile information;

determining, by the one or more physical processors, based on the first natural language utterance and the second natural language utterance, promotional content associated with one of the categories; and presenting, by the one or more physical processors, the promotional content to the user.

51. The method of claim 50, further comprising:

receiving, at the one or more physical processors, a third natural language utterance relating to one or more of the first natural language utterance or the second natural language utterance; and determining, by the one or more physical processors, an interpretation of the third natural language utterance based on the promotional content.

52. The method of claim 51, further comprising:

initiating, by the one or more physical processors, based on the interpretation of the third natural language utterance, a purchase transaction associated with the promotional content.

53. A system for providing promotional content related to one or more natural language utterances and/or responses, the system comprising:

one or more physical processors programmed to execute one or more computer program instructions which, when executed, cause the one or more physical processors to:

receive a first natural language utterance;

provide a response to the first natural language utterance;

receive a second natural language utterance relating to the first natural language utterance;

obtain user profile information associated with a user, wherein the user profile information specifies prior user interactions with items;

identify categories of items based on the prior user interactions specified by the user profile information;

determine, based on the first natural language utterance and the second natural language utterance, promotional content associated with one of the categories; and present the promotional content to the user.

54. A computer-implemented method of providing promotional content related to one or more natural language utterances and/or responses, the method being implemented by a computer system that includes one or more physical processors executing one or more computer program instructions which, when executed, perform the method, the method comprising:

receiving, at the one or more physical processors, a first natural language utterance;

providing, by the one or more physical processors, a response to the first natural language utterance;

receiving, at the one or more physical processors, a second natural language utterance relating to the first natural language utterance;

obtaining, by the one or more physical processors, user profile information associated with a user, wherein the user profile information specifies prior user interactions with items;

identifying, by the one or more physical processors, one or more requests associated with one or more of the first natural language utterance or the second natural language utterance;

determining, by the one or more physical processors, one or more applications for processing the one or more requests; and identifying, by the one or more physical processors, categories of items based on the prior user interactions specified by the user profile information, wherein the categories relate to the one or more applications;

determining, by the one or more physical processors, based on the first natural language utterance and the second natural language utterance, promotional content associated with one of the categories; and presenting, by the one or more physical processors, the promotional content to the user.

55. A system for providing promotional content related to one or more natural language utterances and/or responses, the system comprising:

one or more physical processors programmed to execute one or more computer program instructions which, when executed, cause the one or more physical processors to:

receive a first natural language utterance;

provide a response to the first natural language utterance;

receive a second natural language utterance relating to the first natural language utterance;

obtain user profile information associated with a user, wherein the user profile information specifies prior user interactions with items;

identify one or more requests associated with one or more of the first natural language utterance or the second natural language utterance;

determine one or more applications for processing the one or more requests; and identify categories of items based on the prior user interactions specified by the user profile information, wherein the categories relate to the one or more applications;

determine, based on the first natural language utterance and the second natural language utterance, promotional content associated with one of the categories; and present the promotional content to the user.

* * * * *

UNITED STATES PATENT AND TRADEMARK OFFICE
CERTIFICATE OF CORRECTION

PATENT NO. : 8,886,536 B2  
APPLICATION NO. : 14/016757  
DATED : November 11, 2014  
INVENTOR(S) : Tom Freeman et al.

It is certified that error appears in the above-identified patent and that said Letters Patent is hereby corrected as shown below:

On the title page, in Item (72) Inventors, change "Mike Kennwick" to --Mike Kennewick--.

Signed and Sealed this
Twenty-eighth Day of April, 2015

Michelle K. Lee
*Director of the United States Patent and Trademark Office*